UNITED STATES PATENT OFFICE.

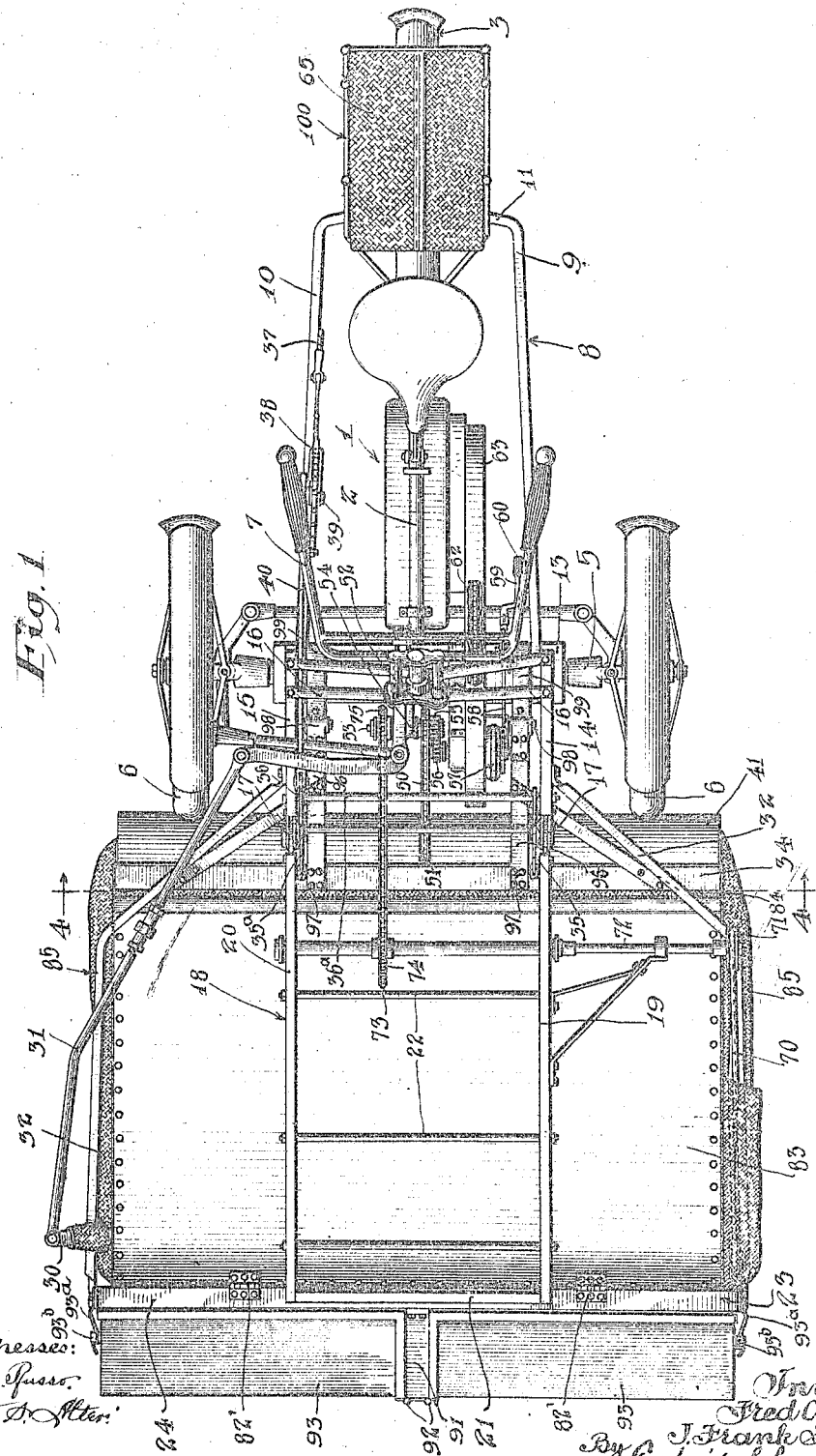

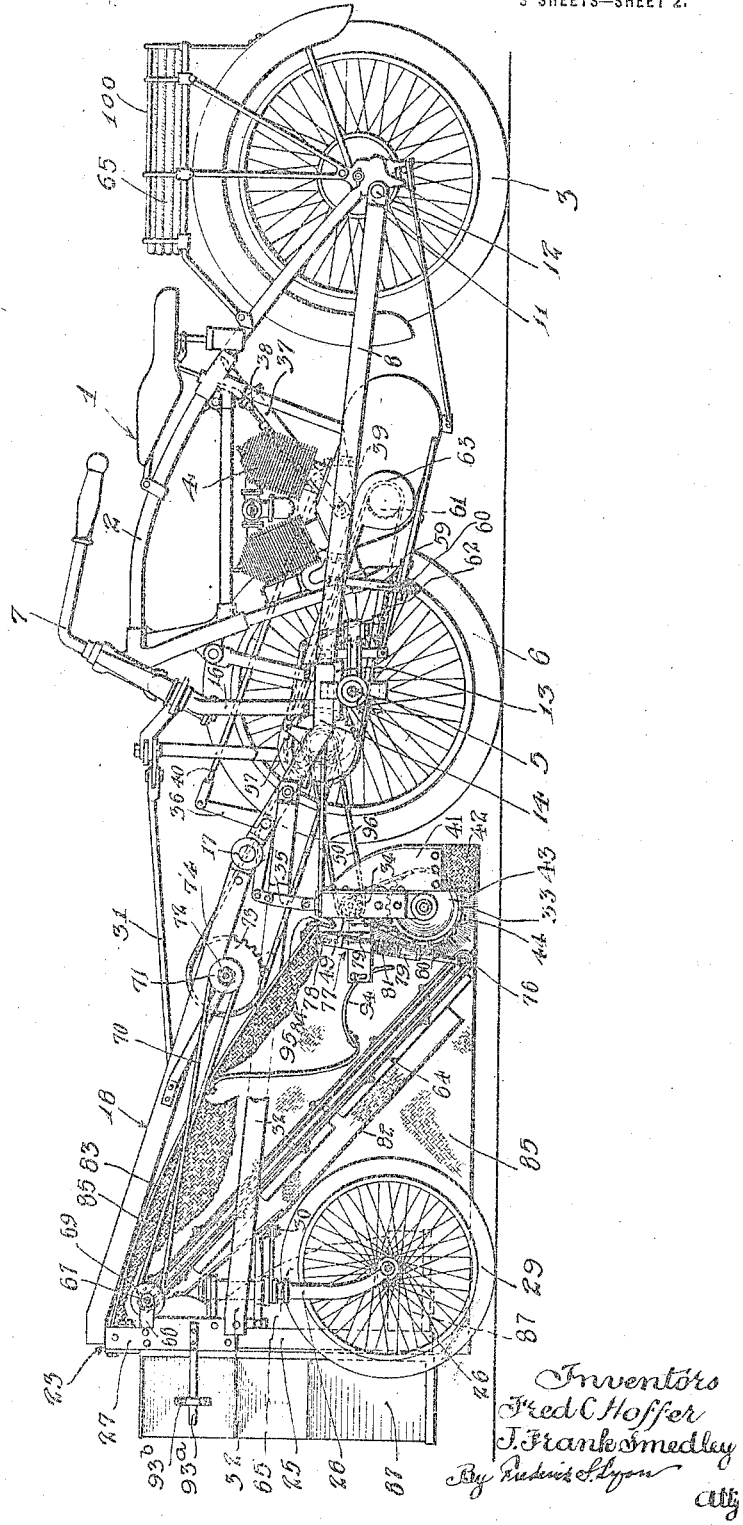

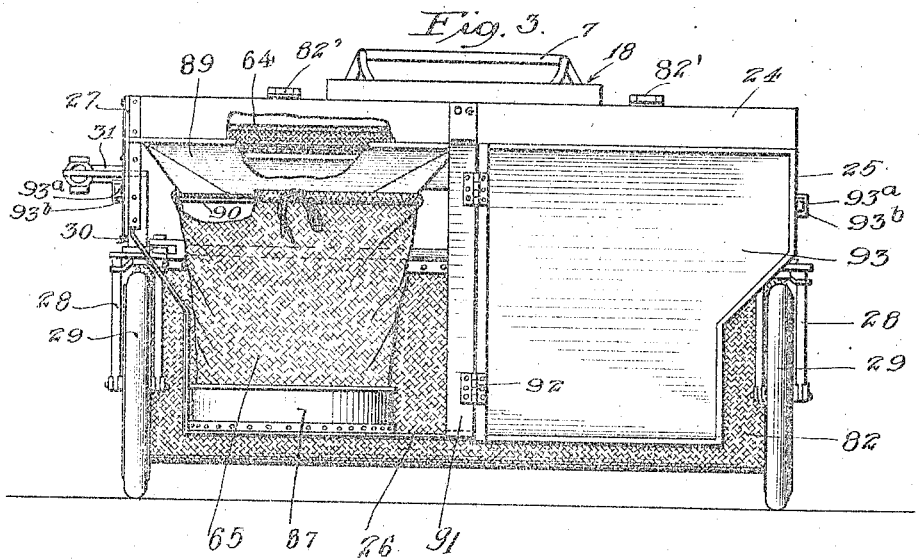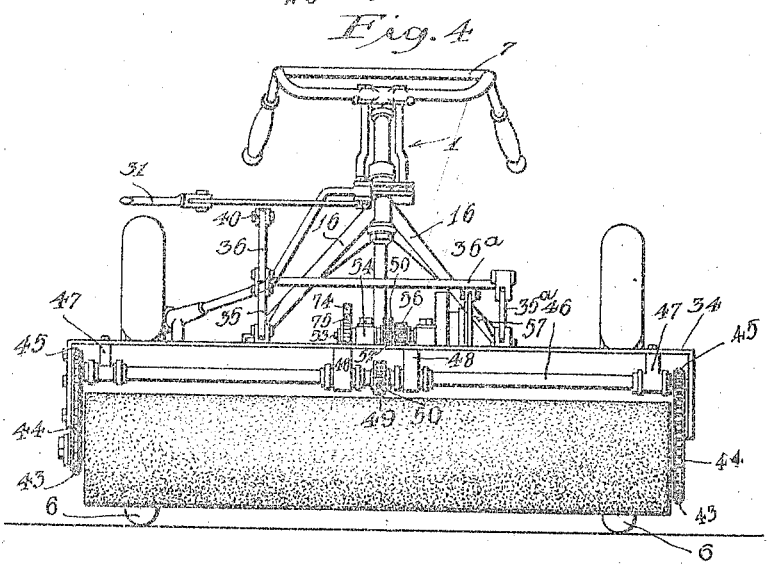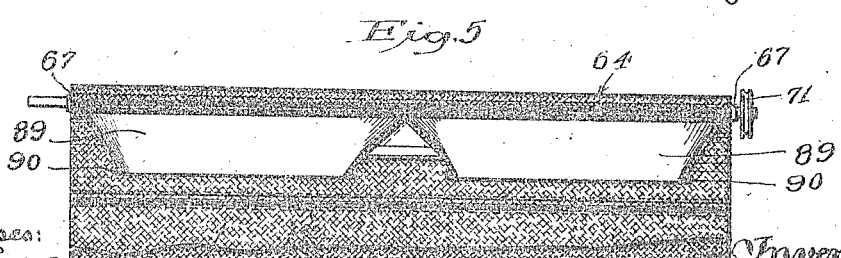

FRED C. HOFFER, OF LOS ANGELES, AND JESSE FRANK SMEDLEY, OF PASADENA, CALIFORNIA, ASSIGNORS TO MOTORCYCLE SWEEPER COMPANY, OF LOS ANGELES, CALIFORNIA, A CORPORATION OF CALIFORNIA.

STREET-SWEEPER.

1,254,802.      Specification of Letters Patent.      Patented Jan. 29, 1918.

Application filed July 11, 1916. Serial No. 108,561.

*To all whom it may concern:*

Be it known that we, FRED C. HOFFER and JESSE FRANK SMEDLEY, both citizens of the United States, residing at Los Angeles and Pasadena, respectively, in the county of Los Angeles and State of California, have invented a new and useful Street-Sweeper, of which the following is a specification.

This invention relates to improvements in street sweepers of the motor vehicle type, and the primary object is to provide a motorcycle street sweeper in which a standard motorcycle or similar light motor vehicle may be used as a propelling and operating means for the sweeper, said sweeper and motorcycle being interconnected and associated so as to provide a compact, durable, light and effective machine.

Another object of the invention is to provide a motorcycle street sweeper in which the sweeping means may be readily controlled from the operator's seat of the motorcycle.

Another object is to provide a street sweeping machine in which there is employed a rubbish receptacle and means for conveying rubbish swept up by the sweeping means into the receptacle.

A further object is to so construct the sweeping and coöperating means so that it may be readily attached by means of a special frame to the frame of a standard motorcycle and will be disposed in such manner relative to the motorcycle as to provide for its operation and the operation of the motorcycle in a reliable, easy and effective manner.

A still further object is to provide a special frame construction for supporting the sweeping means, rubbish conveying means and rubbish receptacle so that they are not subject to derangement, are compactly arranged and so that they do not interfere with the steering or operation of the motorcycle.

In the drawings,

Figure 1 is a top plan view of the machine.

Fig. 2 is a side elevation showing parts broken away in section.

Fig. 3 is a front elevation with parts broken away and in section.

Fig. 4 is a transverse sectional view taken on line 4—4 of Fig. 1.

Fig. 5 is an enlarged fragmentary detail view of the elevator means.

Referring to the drawings, 1 designates as an entirety a motor vehicle which in this instance is a motorcycle of standard construction and includes a main frame 2, rear wheel 3, motor 4, front axle 5, front wheels 6, and steering means 7, which will be later more fully described.

A main frame 8 is secured to the motor vehicle 1 and comprises bars 9 and 10 located on opposite sides of the frame 2, the rear ends of the bars being offset inwardly as at 11 and secured by suitable fastening means 12 to the rear axle of the vehicle. The bars 9 and 10 extend over and upon the axle 5, there being provided an elongated horizontal plate 13 upon the upper side of the axle for the supporting of said bars 9 and 10.

Mounted upon the plate 13 and secured by suitable fastening means to the ends of the bars 9 and 10 are upwardly outwardly extending bars 14 and 15. Secured to these bars 14 and 15 and extending upwardly therefrom are pairs of brace rods 16 which are connected with the column of the steering means 7.

The bars 14 and 15 are pivotally connected as at 17 at their outer ends with an auxiliary mechanism supporting frame 18 which comprises parallel side bars 19 and 20 connected at their outer ends by a bar 21 and intermediate their ends by brace rods 22. Secured to the forward end of the frame 18 and depending therefrom is a somewhat rectangular frame 23 comprising a horizontal top bar 24, side bars 25 and a horizontal bottom bar 26. The side bars 25 have reinforcing plates 27 secured thereto adjacent to their upper ends and fixed to the plates 27 rearwardly of the side bars are rotatable wheel supporting forks 28, upon which are mounted wheels 29 for supporting the forward part of the mechanism. The forks 29 are connected with one another by suitable means 30, said means having connection by means of a rod 31 with the steering means 7 of the motorcycle. It will be seen that the frame 18 will be permitted upward movement when the wheels 29 encounter rough road surfaces and this will prevent undue strains and jars upon the motorcycle. Brace bars 32 are secured to the frame 23 at the ends of the frame and extend rearwardly beneath the frame 18 and are connected with the bars 15 and 16.

A rotary street-sweeping brush 33 which is of greater length than the distance between the wheels 6 of the motorcycle is located between the wheels 6 and 29. This brush is supported in an inverted U-frame 34, the frame being connected by means of links 35 and 35ª with a bell crank 36 secured to a shaft 36ª journaled between the bars 15 and 16 and with said shaft. A raising and lowering lever 37 having lever-locking mechanism 38 thereon is pivoted as at 39 upon the bar 10 and is connected by means of a rod 40 with the bell crank 36. The lever 37 is located so that it can be easily reached from the operator's seat of the motorcycle.

A hood 41 is carried upon the rear side of the frame 34 and covers the brush 33 so as to prevent the scattering of dust and rubbish. A flexible apron 42 is secured to the lower side and ends of the hood and is adapted to contact with the surface being swept, in the rear and at the ends of the brush.

A large sprocket 43 is fixed to the brush at one end thereof and a chain 44 is mounted upon said support and a smaller sprocket 45 which is fixed to a rotatable shaft 46 journaled in the frame 34. The shaft 46 is provided at its ends and centrally with bearings 47 and 48 respectively. A sprocket 49 is fixed to the shaft 46 centrally thereof and has mounted thereon a chain 50. The chain 50 extends through an opening 51 in the hood 41 and is mounted upon a sprocket 52 carried by a countershaft 53. The countershaft 53 is journaled on a bearing 54 which extends outwardly from the plate 13 and is connected thereto. A pinion 55 is fixed to the countershaft 53 and meshes with a pinion 56 which is a part of the clutch means 57. The clutch means 57 may be of any suitable character and is controlled by a rod 58 and pedal 59. The pedal 59 is located adjacent to the driver's seat on the motorcycle and is adapted to be held in operative position by means of a spring catch 60. A sprocket 61 driven by the motor 4 and located at one side thereof supports and drives the chain 62 which is connected with the clutch means 57 and is covered by a casing 63.

There is provided an elevator 64 which extends upwardly and forwardly from the brush 33 and carries rubbish swept up by the brush into position to be dumped into sacks 65. The elevator is of the endless conveyer type and preferably comprises a canvas or other wide belt 66, there being provided a horizontal driving shaft 67 for rotating the elevator, at the upper end of the frame 23. Bearings 68 are secured to the plates 27 and extend rearwardly thereof and support the shaft 67. A pulley 69 mounted upon the shaft 67 is driven by a crossed belt 70 which is also mounted upon a pulley 71 fixed to a shaft 72. A sprocket 73 is fixed to the shaft 72 and has mounted thereon a chain 74, the latter being driven by and mounted upon a sprocket 75 which is fixed to the countershaft 53. At its lower end the elevator 64 is supported upon a roller 76 which is journaled in hanger members 77, the latter being pivoted as at 78 at their upper ends to extensions 79 carried by the frame 34. This connecting of the hangers 77 with the frame 34 provides for the raising and lowering of the lower end of the elevator with the brush 33. The members 77 comprise cylinders 79 in which are mounted plungers 80, the latter being connected with the roller 76 and normally held in extended position against the action of springs 81 mounted within the cylinders 79. This construction provides for the yielding or upward movement of the elevator should said lower end come into contact with an obstruction or rough portion of the surface being swept.

There is provided a guard sheet 82 upon the lower side of the elevator 64 so as to catch rubbish which may fall from the upper end of the conveyer and convey it to a point adjacent the lower end of the conveyer in front of the brush. This sheet 82 may be of any suitable material and supported and connected as desired to the frames 18 and 23.

Hinged to the bar 24 of the frame 23 as at 82′ and extending rearwardly and downwardly over the elevator and coöperating parts is a cover plate 83 which is connected by means of a flexible strip 84 with the upper end of the frame 34 so as to provide for a relative vertical movement of the frame 34. Secured to the side edges of the cover plate 83 are preferably flexible curtains 85 which cover the sides of the elevator and together with the plate 83 approximately inclose the entire elevator and brush so as to prevent scattering of dust during the sweeping operation.

Supported upon the bar 25 of the frame 23 are receptacles 87 for supporting rubbish receptacles or sacks 65, a pair of these receptacles 87 being provided. Chutes or hoppers 89 are carried by the frame 23 and arranged so that the rubbish elevated will be dumped therein. These hoppers 89 are provided with beaded mouths 90 around which are secured the sacks 65. A vertical bar 91 is secured to the bars 26 and 24 of the frame 23 and has hinged thereto as at 92 casings 93 which inclose the lower part of the frame and hide the sacks 65 from view. Spring catches 93ª are carried by the plates 27 and coöperate with keepers 93$^b$ on the casings 93 to hold the latter in place.

There is provided a curved deflector plate 94 which is adjustably secured to the extensions 79 of the frame 34. A canvas or other flexible apron 95 is secured to one longitudinal edge of the deflector plate 94 and to the cover plate 83 upon the inner side of said cover plate. The plate 94 is so located as to prevent material swept up by the brush from being thrown upwardly and back of the brush instead of forwardly and upon the elevator 64.

Brace bars 96 are rigidly connected as at 97 to the frame 34 and are hinged as at 98 to extension members 99 which are secured to the plate 13. There is provided a rack 100 on the motorcycle over the rear wheel thereof for the purpose of supporting a number of the sacks 65.

In operation the motorcycle is started in the ordinary manner and to sweep a street the brush 33 is lowered from position shown in Fig. 2 to a position such as will contact with the street. This is done by moving the lever 37 forwardly, allowing the frame 34 which supports the brush and also the elevator 64 to assume operative position. The clutch pedal 59 is next pushed downwardly until it snaps under the spring catch 60. This causes a rotary motion to be transmitted from the pinion 56 to the pinion 55, the countershaft 53, sprockets 75 and 52 on said countershaft, chains 50 and 74, shafts 46 and 72, sprocket chains 44 and belt 70, the sprocket 43, shaft 67 and elevator 64, causing the brush 33 to be rotated in a clockwise direction and the elevator to be rotated counter-clockwise. Rotation of the elevator causes the rubbish swept up by the brush to be carried upwardly upon the elevator and dumped into the hoppers 89 which conduct the rubbish into the sacks 65. The cover plate 83 and side curtains carried thereby together with the hood 41 practically incase the brush and elevator and thus scattering of dust is prevented. The frame 18 being pivoted as at 17 is adapted to swing upwardly when the machine encounters irregularities; thus shocks and jars are not communicated to the machine.

By pulling the lever 37 rearwardly the brush and elevator may be raised and held clear of the ground to the extent desired so that the machine may travel freely. After the sacks 65 have been filled they may be removed by moving the spring catches 93$^a$ from the keepers 93$^b$ and swinging the casings 93 into open position.

It is understood that the invention is not limited to the exact construction shown in the drawings and described above, but that deviations therefrom may be made within the spirit and scope of the subjoined claims.

We claim:

1. In a street sweeper, a frame adapted to be secured to a vehicle frame and to extend in front thereof, a brush supporting frame pivotally connected with the first named frame, a brush rotatably mounted in the brush supporting frame, means to operate the brush, a rubbish receiving means, and a frame supporting said means and connected with the first named frame.

2. In a street sweeper, a vehicle frame, a wheel supporting the frame, a frame secured to the vehicle frame, and extending in front thereof, a rotary brush connected with the second named frame and being vertically adjustable, a rubbish receptacle, an elevator for conveying rubbish swept up by the brush to the receptacle, means to operate the elevator, and a connection between the brush and elevator for moving the elevator with the brush.

3. In a street sweeper, a vehicle frame, a vertically adjustable frame, means for connecting the vertically adjustable frame with the vehicle frame, a frame secured to and depending from the vertically adjustable frame, a rubbish receptacle supported by the last named frame, a brush supporting frame connected with said connecting means, a brush carried by said brush supporting frame, means to rotate the brush, and means to convey rubbish swept up by the brush to the receptacle.

4. In a street sweeper, a vehicle frame, a vertically adjustable frame, means to connect the vertically adjustable frame with the vehicle frame, a frame secured to the outer end of and depending from the vertically adjustable frame, wheels secured to and supporting the last named frame, a brush supporting frame connected with said connecting means, a brush carried by said brush supporting frame, and means to operate the brush.

5. In a street sweeper, a vehicle frame including a front axle, wheels on the front axle and means to steer said wheels, bars secured to the vehicle on opposite sides thereof and extending along the sides of the vehicle over and upon the front axle, bars secured to the ends of said first named bars and extending outwardly and upwardly from the axle, a frame hinged to the outer end of said last named bars, a second frame secured to and depending from the last named frame, wheels secured to the last named frame, and steering means connected with said wheels and the steering means of the vehicle.

6. In a street sweeper, the combination with a vehicle including a front axle, wheels on the front axle and means to steer said wheels, bars secured to the vehicle on opposite sides thereof and extending along the sides of the vehicle over and upon the front axle, bars secured to the ends of said first named bars and extending outwardly and upwardly from the axle, a frame hinged to the outer end of said last named bars, a second frame secured to and depending from the last named frame, wheels secured to the last named frame, steering means connected with said wheels and the steering means of the vehicle, a brush supporting frame connected with the second named bars, a brush mounted in said brush supporting frame, and means to rotate the brush.

7. In a street sweeper the combination with a vehicle including a front axle, wheels on the front axle and means to steer said wheels, bars secured to the vehicle on opposite sides thereof and extending along the sides of the vehicle over and upon the front axle, bars secured to the ends of said first named bars and extending outwardly and upwardly from the axle, a frame hinged to the outer end of said last named bars, a second frame secured to and depending from the last named frame, wheels secured to the last named frame, steering means connected with said wheels and the steering means of the vehicle, a rubbish receptacle carried by the second named frame, street sweeping means, means to support the street sweeping means, and means to convey rubbish swept up by the street sweeping means into the receptacle.

8. In a street sweeper the combination with a vehicle including a rear axle and a front axle, of bars secured to the rear axle and extending along opposite sides of the vehicle, a plate mounted upon said front axle and supporting said bars, said bars being mounted upon said plate and extending outwardly and upwardly therefrom, a frame hinged for vertical movement to the outer ends of said last named bars, a second frame secured to the last named frame and depending therefrom, a rubbish receptacle supported by the second named frame, a rotary street sweeping brush carried by the vehicle, means for rotating the brush operatively connected with the motor of the vehicle, and means for conveying material swept up by the brush into the receptacle.

9. In a street sweeper the combination with a vehicle including a rear axle and a front axle, of bars secured to the rear axle and extending along opposite sides of the vehicle, a plate mounted upon said front axle and supporting said bars, said bars being mounted upon said plate and extending outwardly and upwardly therefrom, a frame hinged for vertical movement to the outer ends of said last named bars, a second frame secured to the last named frame and depending therefrom, a rubbish receptacle supported by the second named frame, a rotary street sweeping brush carried by the vehicle, means for rotating the brush operatively connected with the motor of the vehicle, means for conveying material swept up by the brush into the receptacle, a cover plate secured to the last named frame beneath the first named frame and extending to a point adjacent to the brush, a hood for said brush, and a flexible element connecting the cover plate with the hood.

10. In a street sweeper the combination with a vehicle including a rear axle and a front axle, of bars secured to the rear axle and extending along opposite sides of the vehicle, a plate mounted upon said front axle and supporting said bars, said bars being mounted upon said plate and extending outwardly and upwardly therefrom, a frame hinged for vertical movement to the outer ends of said last named bars, a second frame secured to the last named frame and depending therefrom, a rubbish receptacle supported by the second named frame, a rotary street sweeping brush carried by the vehicle, means for rotating the brush operatively connected with the motor of the vehicle, means for conveying material swept up by the brush into the receptacle, a cover plate secured to the last named frame beneath the first named frame and extending to a point adjacent to the brush, a hood for said brush, a flexible element connecting the cover plate with the hood, and flexible covering members secured to the ends of the cover plate and a casing for said receptacle being connected with the last named frame.

11. A street sweeper comprising a rotary brush, means to rotate the brush, a frame for supporting the brush, a second frame carried by the first named frame, a rubbish receptacle connected with the second frame, a hood covering the top, rear side and ends of the brush, an elevator for conveying rubbish swept up by the brush into the receptacle, a cover plate secured to the second named frame and extending over the elevator, flexible cover members secured to the ends of the plate and covering the sides of the elevator, and flexible means connecting the cover plate with the hood.

12. A street sweeper comprising a rotary brush, means to rotate the brush, a frame for supporting the brush, a second frame carried by the first named frame, a rubbish receptacle connected with the second frame, a hood covering the top, rear side and ends of the brush, an elevator for conveying rubbish swept up by the brush into the receptacle, a cover plate secured to the second named frame and extending over the elevator, flexible cover members secured to the ends of the plate and covering the sides of the elevator, flexible means connecting the cover plate with the hood, and a plate secured beneath the elevator and being equal in length to the elevator and terminating at its lower end at a point adjacent to the brush.

13. In a street sweeper, a vehicle frame, a frame connected with the vehicle frame, a frame pivotally connected with the second named frame, another frame secured to and depending from the third named frame, a rotary brush, means for supporting the brush connected with the second named frame, means to operate the brush, and wheels supporting the first and last named frames.

14. In a street sweeper the combination with a vehicle frame, a frame connected with the vehicle frame, a shaft mounted upon the second named frame, a rotary street sweeping brush, a frame for supporting said brush connected with the second named frame, a bell crank fixed to said shaft, links connecting said last named frame with the bell crank, means to lock said bell crank to raise and lower the third named frame and brush, a brace rod fixed to the last named frame and hinged to the first named frame, and means to rotate said brush.

15. In a street sweeper, a vehicle frame, a frame supported by the vehicle frame, a rotary brush, a frame for supporting said brush connected with the second named frame, means to rotate the brush, a hood carried by the brush supporting frame extending above and rearwardly of the brush, rubbish receptacles, means to convey material swept up by the brush to the receptacles, a cover plate extending over said means, and a flexible connection between the hood and cover plate.

16. In a street sweeper the combination with a vehicle frame of a frame supported thereby, a brush supporting frame vertically adjustably connected with the second named frame, a rotary sweeping brush carried by the third named frame, means to rotate the brush, rubbish receptacles, means to convey material swept up by the brush to the receptacles, and a yieldable connection for said means and the last named frame.

17. In a street sweeping machine, a vehicle, a frame supported by the vehicle, a brush supporting frame vertically adjustably connected with the first named frame, a rotary sweeping brush carried by the brush supporting frame, means to rotate the brush, a rubbish receptacle, means to convey materials swept up by the brush to the receptacle, a hood for said brush carried by the second named frame and extending above and rearwardly of the brush, a cover plate for said conveying means, curtains secured to the sides of the cover plate and depending therefrom, a flexible strip connecting the hood with the cover plate, and a deflector member carried by the second named frame and located between the cover plate and conveying means above and in advance of the brush to prevent rubbish from being thrown upwardly and rearwardly relative to the brush.

18. In a street sweeper the combination with a vehicle frame of a frame carried by the vehicle, a rotatable sweeping brush, means to vertically adjustably support the brush from the second named frame, a rubbish receptacle, an elevator connected with the second named frame, and a frame for supporting said brush, said elevator being relatively yieldably connected with the last named frame.

19. In a street sweeper the combination with a vehicle frame of a frame carried by the vehicle, a rotatable sweeping brush, means to vertically adjustably support the brush upon the second named frame, a rubbish receptacle, an elevator connected with the second named frame, said elevator being relatively yieldably connected with the means for supporting the brush, said elevator being pivoted at its upper end to the second named frame, a cover plate extending over the elevator, and a flexible strip connecting the cover plate with the means for supporting the brush.

20. In a street sweeper the combination with a vehicle frame of a frame supported thereby, a brush supporting frame connected with the second named frame, a brush journaled in the brush supporting frame, means to rotate the brush, means to vertically adjustably connect the brush frame with the first named frame, an elevator pivoted at its upper end to the second named frame, a rubbish receptacle located adjacent to and below the elevator at the upper end thereof, said lower end of the elevator being disposed adjacent to the lower side of the brush, means connecting the lower end of the elevator with the brush frame permitting upward movement of the lower end of the elevator relative to the brush, and means to raise and lower the brush frame.

Signed at Los Angeles, California, this 26th day of June 1916.

FRED C. HOFFER.
J. FRANK SMEDLEY.

Witnesses:
CHAS. J. CHUNN,
MARY E. BLASDEL.